United States Patent

[11] 3,594,597

[72] Inventors Vasily Semenovich Kildishev
ulitsa Plekhanovskaya, 41/43, kv. 55;
Boris Leonidovich Konovalov, ulitsa 12
Aprelya, 10, kv. 16; Alexandr Abramovich
Chigirinsky, ulitsa Kuibysheva, 11, kv. 8;
Lazar Yankelevich Stanislavsky, ulitsa
Mayakovskogo, 11, kv. 24; Boris Volkovich
Spivak, ulitsa Kosiora, 56, kv. 55; Vladimir
Grigorievich Rakogon, ulitsa Bairona,
146/2, kv. 19, all of Kharkov, U.S.S.R.
[21] Appl. No. 888,013
[22] Filed Dec. 24, 1969
[45] Patented July 20, 1971

[54] DEVICE FOR FIXING STATOR WINDING BARS IN
THE SLOTS OF ELECTRIC MACHINES
8 Claims, 7 Drawing Figs.

[52] U.S. Cl. .................................................. 310/214
[51] Int. Cl. ................................................. H02k 3/48
[50] Field of Search ........................................ 310/214,
265, 201

[56] References Cited
UNITED STATES PATENTS
984,182 2/1911 Barr ............................. 310/214
3,243,622 3/1966 Whittlesey ..................... 310/214
3,393,335 7/1968 Pletenik et al. ................. 310/214

Primary Examiner—D. X. Sliney
Attorney—Waters, Roditi, Schwartz and Nissen

ABSTRACT: A device for fixing stator winding bars in the slots of electrical machines, comprises a wedge constituted of two portions of which one is placed into a longitudinal groove in the other portion; an elastic member is provide between the wedge portions to create an interference between the wedge and the bar, the elastic member being adapted, while in operation, to press one of the wedge portions against the winding bar.

PATENTED JUL20 1971 3,594,597

DEVICE FOR FIXING STATOR WINDING BARS IN THE SLOTS OF ELECTRIC MACHINES

The present invention relates to devices for fixing stator winding bars in the slots of electrical machines.

Known in the art are devices for fixing windings in the slots of electrical machines, to eliminate the possibility of bar vibrations caused by interaction of currents flowing along the winding bars.

Thus, for example, a device is now known, wherein spacers are placed between the wedges and the bar, the spacers being made of an elastic material or preliminarily bent flat resilient elements capable of exerting a pressure upon the bar thus eliminating possible vibration thereof.

Disadvantageous features inherent in devices with spacers of an elastic material interposed between the bar and the wedges, are: impossibility of obtaining a definite force or pressure on the bar, this adversely affecting the quality of fixing and hampering its preestimation; increased labor in assembly due to deformation of the elastic element by the wedges during their installation.

A disadvantage inherent in a device for radial fixing of stator winding bars in the slots of electric machines by making use of preliminarily bent resilient elements placed in between the bar and the wedges, resides the fact that the resilient elements made of steel, rest with their small separate portions on one side upon the insulating material of the wedge, and on the other side, upon the intermediate insulation spacers placed between the bar and the resilient element to prevent damage to the bar insulation.

It is due to the above construction that in the course of operation the resilient element is liable to cause gradual localized wear on the material of both the wedges and the spacers.

It is an object of the present invention to eliminate the disadvantages mentioned above.

It is another object of the present invention to provide such a device for fixing stator winding bars in the slots of electrical machines that prevents any vibration of the bars.

According to the invention, these objects are accomplished by a device for fixing stator winding bars in the slots of electric machines, comprising a wedge and an elastic member to provide an interference between the wedge and the bar, said wedge is being constituted of two portions, one of which is inserted into a longitudinal recess or groove made in the other wedge portion, while said elastic member is placed therebetween so as to force one of the wedge portions, while in operation, against the winding bar.

It is expedient that the supporting ends of the elastic member be isolated from the wedge by protective spacers or separators preventing the formation of locally worn out spots on the wedge material, and that both portions of the wedge be interconnected by a screw-clamp arrangement adapted to press one of the wedge portions against the other to provide free fitting of the wedge into the slot of the stator core.

The device proposed here and described in greater detail hereinbelow, provides a uniform preset value of pressure exerted upon the stator winding bars, considerably increases the reliability of winding bar fixation which eliminates the danger of bar conductor breakage due to vibration and, consequently, increases the dependability of the machine operation. The device ensures also a periodic rewedging of the winding, whereas it is also simple in manufacture and convenient in assembling.

The invention will now be described with regard to exemplary embodiments thereof with reference to the accompanying drawing, wherein.

Figure 1:
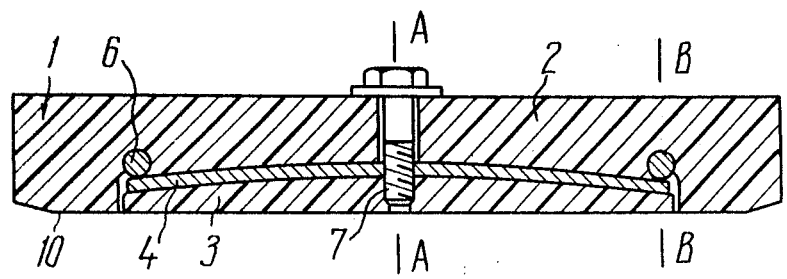
FIG. 1 is a longitudinal section view of one embodiment of a device for fixing stator winding bars in the slots of an electrical machine.
Figure 2:
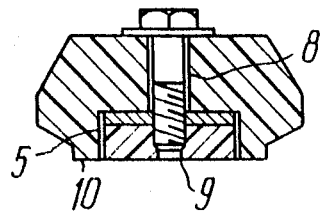
FIG. 2 is a section taken on the line A–A in FIG. 1.
Figure 3:
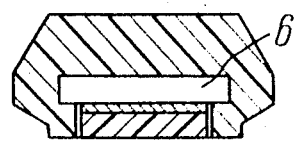
FIG. 3 is a section taken on the line B–B in FIG. 1.
Figure 7:
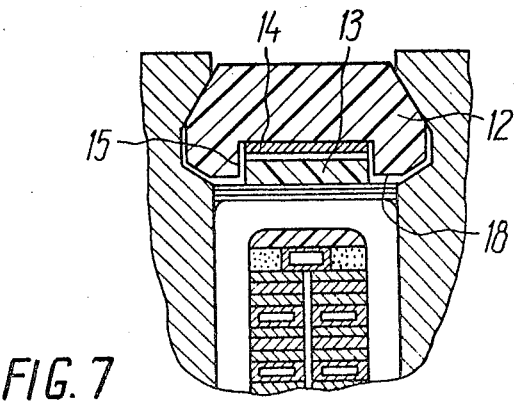
FIG. 7 is a section taken on the line D–D in FIG. 4.
Figure 4:
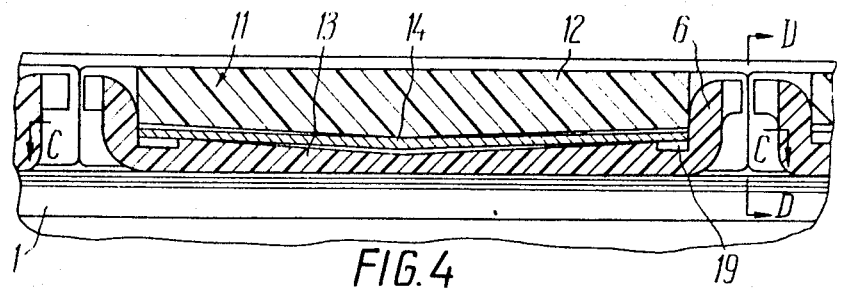
FIG. 4 is a longitudinal section view of another embodiment of a device for fixing stator winding bars in the slots of an electrical machine.
Figure 5:
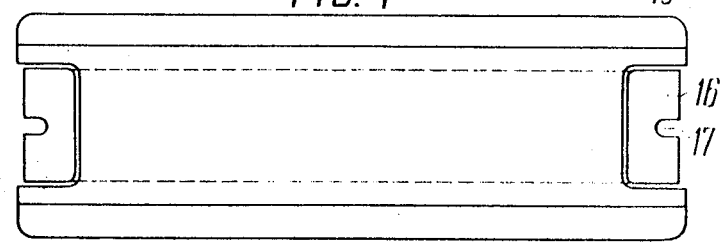
FIG. 5 is a plan view of the embodiment in FIG. 4.
Figure 6:
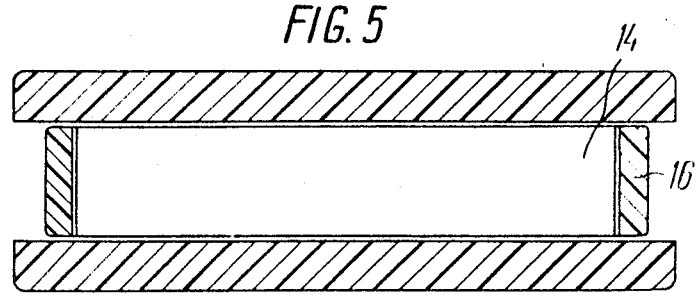
FIG. 6 is a section taken on the line C–C in FIG. 4.

As can be seen from FIGS. 1—3 of the drawing, the device for fixing stator winding bars in the slots of an electrical machine comprises a wedge 1 divided into two portions 2 and 3 between which is placed an elastic member 4, made of metal or of any other elastic material having no permanent set due to external forces exerted thereupon. The portion 3 of the wedge and the elastic member 4 are placed into a longitudinal groove 5 made in the portion 2 of the wedge 1. The portion 3 of the wedge 1 is rigid and in operation, portion 3 is pressed by the elastic member 4 against the stator winding bar, thus imparting the compressive force from the member 4 thereto. The magnitude of the force exerted by the elastic member 4 can be predetermined by selecting an appropriate and suitable area of the elastic member 4 and the value of its temporary set so that, with the bars gradually becoming shrunk in the slots, the above-said force would not yield to the forces exerted upon the bar.

If the elastic member is made of a material stronger than that of the wedge such as steel, protective spacers or separators 6 are provided in the wedge 1 at the places of support of the ends of the elastic member 4 to preclude the formation of locally wornout spots on the material of the wedge 1.

To provide greater convenience in fitting the wedge 1 into the core slot, the portion 3 of the wedge is pressed against the portion 2 thereof by a bolt 7 which is installed during assembly in a hole 8 in the center of the wedge 1 and is screwed into a threaded hole 9 in the portion 3 of the wedge.

FIGS. 1, 2 and 3 represent the wedge 1 with its portion 3 pressed in. After the wedge 1 has been fitted in position, the bolt 7 is removed to release the portion 3 of the wedge 1 which thus is pressed against the bar surface. An area 10 of the portion 2 of the wedge 1 located around the groove 5, serves to restrict possible displacement of the bar in the groove 5 under the effect of forces arising between the bars due to a short circuit which forces are several times the rated forces.

FIGS. 4, 5, 6 and 7 show another possible modification of the device disclosed herein, comprising a wedge 11 divided into two portions 12 and 13 between which an elastic member 14 is placed. In the herein-considered implementation of the device for fixing stator winding bars in the slots of electric machine, the portion 13 of the wedge 11 and the elastic member 14 are likewise placed into a groove 15 in the portion 12 of the wedge 11, the difference between the former and the latter modifications being that the portion 13 of the wedge 11 extends the length of the entire wedge 11 and at its ends is provided with projections 16 having cutouts or recesses 17 for engaging an arrangement (not shown) adapted to press the portion 13 of the wedge 11 against the portion 12 thereof when the wedge 11 is inserted into the core slot.

The wedge 11 has a restriction surface 18 to prevent possible displacement of the bar in the groove 15 when short circuit occurs.

When the elastic member 14 is made of steel, provision is made for protective spacers or separators 19 at the places where the ends of member 14 thrust against the wedge body, said spacers precluding the formation of locally wornout spots on the material of the wedge 11.

When said elastic member is made of a resilient material such as rubber, in both cases the protective spacers 6 and 19 are not provided.

What we claim is:

1. A device for fixing stator winding bars in the slots of electrical machines, said device comprising: a wedge constituted by first and second portions, the first portion having a longitudinal groove therein, the second portion being slidably received in said groove, an elastic member placed in said groove and between said portions to press, while in operation, one of the wedge portions against a winding bar so as to provide an interference between the wedge and the bar.

2. A device as claimed in claim 1, wherein said elastic member has supporting ends, and said device comprises protective separators between said wedge and said supporting ends of the elastic member to isolate said ends and prevent the formation of locally worn regions in said wedge.

3. A device as claimed in claim 2, comprising means for interconnecting both of said wedge portions to press the wedge portions against each other and permit insertion of the wedge into a slot of the stator core.

4. A device as claimed in claim 3, wherein said means for interconnecting the wedge portions comprises a fastener engaged in one portion and threaded in the other portion.

5. A device as claimed in claim 1 wherein said second portion of the wedge has ends with projections embracing said first portion at the ends thereof, said ends being engageable to press the wedge portions together against the opposition of the elastic member to permit insertion of the wedge into a slot of the stator core.

6. A device as claimed in claim 5 wherein said ends have recesses therein for facilitating the engagement of said ends.

7. A device as claimed in claim 1 comprising means for temporarily pressing the wedge portions together against the opposition of the elastic member to permit insertion of the wedge into a slot of the rotor core whereafter the means can be disabled.

8. A device as claimed in claim 7 wherein said means for pressing the wedge portions together comprises removable attachment means interconnecting wedge portions.